United States Patent [19]

Evain et al.

[11] Patent Number: 5,302,296
[45] Date of Patent: Apr. 12, 1994

[54] WATER CLARIFICATION USING COMPOSITIONS CONTAINING A WATER CLARIFIER COMPONENT AND A FLOC MODIFIER COMPONENT

[75] Inventors: Eric J. Evain, Mobile, Ala.; Hartley H. Downs, Kingwood; Daniel K. Durham, Spring, both of Tex.

[73] Assignee: Baker Hughes Incorporated, Houston, Tex.

[21] Appl. No.: 20,760

[22] Filed: Feb. 22, 1993

Related U.S. Application Data

[62] Division of Ser. No. 540,048, Jun. 19, 1990, Pat. No. 5,190,683.

[51] Int. Cl.$^5$ ................................................ C02F 1/54
[52] U.S. Cl. ...................................... 210/728; 210/705; 210/708; 210/729; 210/732; 210/735; 252/344; 252/358
[58] Field of Search ............... 210/708, 725, 727, 728, 210/729, 732, 705, 735; 252/344, 358, 180

[56] References Cited

U.S. PATENT DOCUMENTS

| | | | |
|---|---|---|---|
| 2,356,764 | 8/1944 | Kern | 260/2 |
| 3,194,758 | 7/1965 | Lissant | 210/732 |
| 4,330,401 | 5/1982 | Boze et al. | 210/106 |
| 4,411,814 | 10/1983 | Burkhardt | 252/344 |
| 4,675,112 | 6/1987 | Verde | 210/616 |
| 4,689,177 | 8/1987 | Thompson et al. | 252/344 |
| 4,826,625 | 5/1989 | Thompson et al. | 252/344 |
| 4,855,060 | 8/1989 | Durham et al. | 210/708 |
| 4,864,075 | 9/1989 | Thompson et al. | 358/237 |
| 4,917,803 | 4/1990 | Allenson | 210/728 |
| 4,956,099 | 9/1990 | Thompson et al. | 210/764 |
| 5,019,274 | 5/1991 | Thompson et al. | 210/729 |
| 5,173,208 | 12/1992 | Chung et al. | 210/728 |
| 5,178,770 | 1/1993 | Chung | 210/728 |

FOREIGN PATENT DOCUMENTS

| | | | |
|---|---|---|---|
| 771181 | 11/1967 | Canada | 260/455 |
| 187394 | 9/1985 | Japan . | |
| 148389 | 6/1989 | Japan . | |

*Primary Examiner*—Peter A. Hruskoci
*Attorney, Agent, or Firm*—Rosenblatt & Assoc.

[57] ABSTRACT

Materials such as amines, alcohols, aminoalcohols, ethers and mixtures thereof, including halogenated adducts thereof, have been found to be useful floc modifiers for water clarifiers to form an effective overall water clarifier composition. The water clarifier portion of the composition is a dithiocarbamate. The floc modifier of a particular water clarifier composition need not be the same compound that is reacted with carbon disulfide ($CS_2$) to make the water clarifier portion of the novel compositions.

11 Claims, No Drawings

WATER CLARIFICATION USING COMPOSITIONS CONTAINING A WATER CLARIFIER COMPONENT AND A FLOC MODIFIER COMPONENT

This is a divisional of copending application Ser. No. 07/540,048 filed on Jun. 19, 1990 now U.S. Pat. No. 5,190,683.

FIELD OF THE INVENTION

The invention relates to additives, blends and compositions for clarifying aqueous systems, and, in one aspect, more particularly relates to modifiers used in conjunction with water clarifiers that modify the nature of the floc in some way as to make it more manageable.

BACKGROUND OF THE INVENTION

Any refinery process water, petroleum chemical waste water, ballast waste water, river water, underground feed water, ethylene quench waste water, oil-in-water waste emulsions from oil recovery fields, and the like are contaminated waters requiring difficult chemical treatment and clarification. These aqueous systems are also found in steam cylinder dispersions in which small amounts of oils which are used for lubrication may be found in the steam of engines and pumps; emulsions and other dispersions containing polystyrene and styrenes-in-water frequently found in synthetic rubber manufacturing facilities; emulsions and other dispersions obtained during clay pipe manufacture using steam initiated processes; oil-in-water emulsions or dispersions which are found in coolant water devices and in gasoline absorption facilities; emulsions and dispersions containing wax-type products which are encountered in oil refinery dewaxing procedures; "fluxoil" emulsions and dispersions occurring in condensate steam resulting in dehydrogenation of butylene during catalytic procedures to produce butadiene; emulsions and dispersions obtained during procedures for making butadiene from naphtha by means of standard "cracking" procedures in gas generators; emulsions and dispersions in latex-in-water formed in copolymerization procedures for butadiene and styrene derivatives.

Such dispersions and emulsions are also problems in synthetic resin paint and pigment manufacturing processes, as well as in food processing of derivatives of pasteurized additives. In each of these processes, as well as in the equipment which is used during steps in the various procedures, oil-in-water emulsions or dispersions of a nonaqueous phase are inherently formed as a by-product of the particular given operation. The disposal of the produced waste water becomes a problem which is compounded by the presence of the oil-in-water emulsions, or dispersions containing a non-aqueous discontinuous phase. Often, extreme difficulties are presented in the treatment and clarification processes employed. If one were to successfully treat these kinds of waste waters which contain oily waste matter as well as dispersed solid matter of an organic or inorganic nature, one could advance the art of treating and clarifying contaminated waters of this type.

The present invention is directed to the clarification of such aqueous systems, so that the resultant stream of the aqueous system contains essentially two separate phases: an oil- or hydrocarbon-based phase, or non-aqueous phase, and an essentially aqueous phase, with the resultant aqueous phase being clarified without the production of a problematic floc. Clarification is accomplished with water clarifiers which are compounds which, when added to produced water containing oil, form "flocs." The dispersed oil and solid particulates adsorb on the floc and thereby are removed from the water when the floc is skimmed off the surface of the treated water. The treated aqueous system can then pass certain industrial and/or governmental water clarity tests or specifications and be discharged.

The aqueous systems contemplated in this invention will contain water in various forms, such as tap water, brines or seawater (in the case of aqueous systems involved in the drilling, completion, workover or production of subterranean oil or gas wells), and the like.

In any oil-in-water emulsion, the amount of oil in the water or aqueous phase, or in the case of a dispersion of non-aqueous phase, the amount of such non-dispersed phase will vary considerably depending on the industrial application. In the case of emulsions which are frequently found in the oil field and in applications of well completion operations, the oil-in-water emulsion will contain a crude oil content varying from a few parts per million to about 20%, by volume, or even higher.

In treating such emulsified or dispersed aqueous systems for disposal or other uses or recycling, it is necessary to break the emulsified oil-in-water or resolve the dispersion such that the oil phase, or the non-aqueous dispersed phase and the water phase may be separated. The water should be clarified by the demulsification treatment without production of a problematic "floc."

"Floc" is considered to be a by-product of water clarification which may vary in characteristics depending on the composition of the clarifier used to clarify the water. While "floc" may always be expected to be produced as a result of a water clarification treatment procedure, such "floc" should be made to be controllable. A problematic floc may adversely affect operations or clarification systems by means of adherence, plugging and interface problems with manufacturing equipment or production equipment. Floc characteristics can be visually judged by observing a sample of the treated aqueous system. The present invention contemplates water clarification such that the floc which is formed does not cause operational problems in the treatment system by means of adherence, plugging, or interface buildup with equipment being exposed to the aqueous system. An improved floc is one that is easily skimmed and does not build up in the system—essentially, a floc which is easier to handle.

In the past, those skilled in the art have recognized the use of derivatives of certain amines as demulsifiers in water clarification procedures. Typical of such prior art is U.S. Pat. No. 4,689,177, which teaches the use of nitrogen-containing dithiocarbamic acid compositions formed by the reaction of alkoxylated triamines with $CS_2$ as "reverse" demulsifiers. While certain of the materials disclosed in the '177 patent may or may not be used satisfactorily to demulsify particular aqueous systems, it has been found that not all such materials are satisfactory to clarify water without the production of a resultant problematic floc.

U.S. Pat. No. 4,855,060 notes that if bis(hexamethylene)triamine (BHMT) is reacted in an approximate stoichiometric ratio of primary amine with carbon disulfide, that the resultant product can be used to successfully break the emulsion and clarify the water, without the production of a problematic floc. In U.S. Pat.

No. 4,855,060, these problematic flocs were termed "uncontrollable" and it will be understood that these terms refer to the same kinds of undesirable flocs. The commercial product related to the material of this patent is marketed by Baker Performance Chemicals, Inc. as MAGNACLEAR® W213 water clarifier, referred to herein as W213. MAGNACLEAR® W213 is a trademark for water clarifier products made by Baker Performance Chemicals, Inc.

On an oil and gas production site, dithiocarbamate water clarifiers work in conjunction with gravity settling equipment, flotation devices, filtration equipment and the like by creating a floc with metal ions in the brine. After the oil and grease have absorbed onto the surface of the floc, the floc is separated and returned to crude production. Most prior flocs are "sticky" and adhere to surfaces inside the equipment. After a relatively short period of time, the build-up of floc on the skimmer, walls and in the trough causes the unit to need to be shut down and cleaned. Preferably, the water clarifier provides an "acceptable" floc which does not cause operational problems in the system via adherence, plugging and interface build-up.

SUMMARY OF THE INVENTION

Accordingly, it is an object of the present invention to provide floc modifiers that can be used in conjunction with present water clarifiers so that the floc produced in water clarification procedures may be less problematic.

It is another object of the present invention to provide a floc modifier that can be used with water clarifiers previously found to be unsuitable for certain applications due to problematic floc, so that such clarifiers may now be beneficially used in the particular applications.

It is yet another object of the invention to provide floc modifiers to be employed with water clarifier compositions, where the floc modifiers are readily obtainable.

In carrying out these and other objects of the invention, there is provided, in one form, a water clarifier composition for aqueous systems with improved floc characteristics which has a water clarifier component selected from the group of dithiocarbamates; and a floc modifier component selected from the group of amines, alcohols, aminoalcohols, ethers and mixtures thereof, and halogenated adducts thereof.

DETAILED DESCRIPTION OF THE INVENTION

It has been discovered that amines, alcohols, aminoalcohols, ethers, and mixtures thereof, and halogenated adducts thereof may be used in conjunction with dithiocarbamate water clarifiers to modify and improve their floc properties when used to clarify aqueous systems. The suitable dithiocarbamates may be those which are formed in the reaction of $CS_2$ with the same amines used as the floc modifiers, or may be different dithiocarbamates. Heretofore, it was believed that the amines from which the dithiocarbmates are formed must be substantially completely reacted to serve as useful water clarifiers. However, it was surprisingly discovered that an appreciable unreacted portion of these amines, or the presence of other amines, alcohols, aminoalcohols, ethers and mixtures thereof and halogenated adducts thereof which improved the floc properties of the water clarifiers.

As used herein, the term "aqueous system" is intended to mean and refer to any water-based stream, the major constituent of which is either tap water, fresh water, a brine, salt water, seawater, or the like, either as a natural additive during a commercial manufacturing procedure, or in the fluids which are used to drill, complete, or workover a subterranean oil or gas well, in production streams of fluid hydrocarbons from subterranean wells, and the like. Also as used herein, the oil or other dispersed constituent in the oil-in-water emulsion or dispersion of non-aqueous discontinuous phase which occurs in such aqueous systems may either be produced hydrocarbons, such as those which are found in a production well, or any hydrocarbon- or grease-containing chemicals, sulfur or similar constituent found in many typical manufacturing procedures, such as those described above.

The process of the present invention contemplates contacting the aqueous system containing the oil-in-water emulsion or dispersion of the non-aqueous discontinuous phase with an effective amount of the composition of the invention. Such contact can occur in a variety of forms, such as by introduction of a "pill" or "slug" of composition through a treatment line or conduit, as known to those skilled in the art in the treatment of produced hydrocarbons from subterranean oil and gas wells, or by a continuous injection procedure. Additionally, the composition may be added to the aqueous system prior to formation of the oil-in-water emulsion or dispersion, or may be added to the water phase which is subsequently found to contain the oil-in-water emulsion or dispersion. Typically, however, the invention will be utilized in an injection procedure wherein the composition will be continuously, or incrementally, introduced into the aqueous system containing the oil-in-water emulsion or dispersion of a non-aqueous discontinuous phase.

The dithiocarbamates which may be utilized in the composition of the present invention are to be made from any suitable amine, including, but not limited to, bis(hexamethylene)triamine, hexamethylenediamine pentaethylenehexamine, Jeffamine® T-403 amine [CAS No. 39423-51-3], Jeffamine T-3000 amine [CAS No. 64852-22-8], aminoethylethanolamine (AEEA), and Amine HH and the like. Such starting materials may be utilized in either their pure or crude forms, and are readily and commerically available from a number of suppliers, including, but not limited to Monsanto, Rhone-Poulenc, DuPont, Texaco Chemical etc.

The floc modifiers may include the dithiocarbamate precursors noted above, and others. It is not necessary to use a floc modifier that is the same as the precursor for a particular dithiocarbamate when selecting a floc modifier for that dithiocarbamate. In one embodiment, the floc modifier component has at least one alkylene or —$(CH_2)_j$— group where j ranges from 1 to 8, and halogenated adducts thereof. In another embodiment, the floc modifier component is selected from the group of compounds having the formulae:

$$X[(CH_2)_aY]_b(CH_2)_cZ$$

where X and Z are independently —$NH_2$, —OH or —H; Y is —O—, —NH—, —$N[(CH_2)_nZ]$—, —$NHCH_2CH_2NH$—, —$CH[(CH_2)_nZ]$— or —$C[(CH_2)_nZ][(CH_2)_mX]$—, a ranges from 2 to 6, b ranges from 0 to 1400, and c, n and m independently range from 0 to 12; except that b and c cannot both be zero;

where Z is defined above, R is -H or an alkyl, aryl or alkylaryl hydrocarbon chain containing less than 19 carbon atoms, d and j independently range from 0 to 102, i ranges from 0 to 39 and p is 0 or 1;

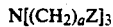

where Z and a are defined as above;

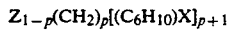

where x, Z and p are defined as above; and

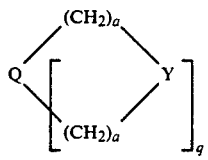

where Q is —O—, —NH— or —N[(CH$_2$)$_n$Z]—, q ranges from 1 to 17, and Y, Z, a and n are defined as above.

A wide variety of amines may be useful as floc modifiers, including, but not limited to, monoamines, such as n-propylamine, n-hexylamine, 2-aminoethanol, triethanolamine, and Surfonamine MNPA-750; diamines such as ethylenediamine (EDA), diaminopropane, 1,6-diaminohexane, 1,12-diaminohexane, 1,4-diaminocyclohexane, and 4,4'-diaminodicyclohexylmethane; and polyamines such as diethylenetriamine (DETA), N-(2-aminoethyl)-1,3-diaminopropane, dipropylenetriamine, N,N'-bis-(3-aminopropyl)ethylenediamine, triethylenetetramine, 1-(2-aminoethyl) piperazine, polyethyleneimine (PEI), tris(aminoethyl)amine (TREN), and mixtures thereof. Others are mentioned in the Examples and in the Glossary herein. Appropriate alcohols include, but are not limited to hexanol, octanol, phenol, ethyleneglycol, glycerol, and mixtures thereof, among others. Useful ethers include, but are not limited to 18-Crown-6, ethoxylated dodecanol, ethoxylated nonylphenol, polyethyleneoxide, polyethyleneoxide-polypropylene oxide copolymers and mixtures thereof, among others.

The proportions used in the water clarifier composition may vary widely. As a proportion of the entire water clarifier composition, the dithiocarbamate proportion should be at least about 5 wt. % and in one embodiment range from about 10 to about 90 wt. %, preferably from about 20 to about 70 wt. %, and most preferably from about 30 to about 50 wt. %. In turn, the floc modifier proportion in the water clarifier composition should be somewhat less than that of the dithiocarbamate, for example, less than about 60 wt. %, and in one embodiment range from about 60 to about 1 wt. %, preferably from about 50 to about 10 wt. %, and most preferably from about 45 to about 15 wt. %, based on the entire water clarifier composition.

In some embodiments, the dithiocarbamate will be a salt of the dithiocarbamic acid, such as an alkali metal, alkali earth metal, ammonium or amine salt thereof. Specific examples of an alkali metal salt include, but are not limited to, potassium, sodium, and lithium salts thereof.

The invention contemplates introduction of the composition at any desired point during the treatment of the aqueous system, such as prior to or at gravity settling equipment, flotation devices, filtration processes, sales lines, and the like. Because of obvious variations in operating parameters, such as type and quantity of oil or other hydrocarbon or other constituents comprising the dispersed non-aqueous discontinuous phase, the amount and quantity of water in the system, the clarification required for the treated aqueous system, and other physical and chemical parameters, as well as the particular dithiocarbamate selected for use, an exact level of required additive cannot be specified. Those skilled in the art will recognize that known clarification and floc evaluation tests, such as those specifically disclosed herein, may easily be used to determine the appropriate level of treatment for the particular application at hand.

The present invention contemplates maintaining the water clarifier composition with the dithiocarbamate and the floc modifier in the aqueous system for sufficient time to effectively clarify the system and to control the resultant floc which occurs as a result of the clarification procedure. Of course, the water quantity and quality, the tightness and content of the oil-in-water emulsion or the dispersion of the non-aqueous discontinuous phase and other chemical and physical variables will dictate the amount of time which is required to effectively clarify the water for the particular end use applications or disposal technique at hand. Those skilled in the art may utilize simple water clarification and floc tests, such as those described below, to determine, among other things, the amount of time required to maintain the composition in the system for effective water clarification.

In determining the ability of a composition, including the additive of the present invention, to clarify an aqueous system and produce a controllable resultant floc, the aqueous system with the composition added thereto is simulated. Water quality is then determined using gravimetric, spectrophotometric, or visual means. A floc rating is then established using techniques described below.

In the examples below, the formation of an acceptable or unacceptable floc was determined by bench scale flotation procedures. If the floc was deemed by visual appearance to be problematic, a floc rating of "U" was given. On the other hand, a floc which was deemed to be acceptable and controllable was given a floc rating of "A".

The presence of a problematic floc is easily determinable by visual observation during bench testing procedures. During such tests, any floc which appears is visually rated against an "acceptable" and known control sample which has been treated with a material to clarify the water without production of a problematic floc. The following rankings are then applied to the particular sample:

Acceptable: Loose, brown appearance.
Acceptable: Agglomerated, brown, appearance.
Unacceptable: Loose, black, powdery, appearance.
Unacceptable: Aggolmerated, black, powdery, appearance.
Unacceptable: Aggolmerated, black, ropy appearance; adheres to solid surfaces.

Unacceptable: Aggolmerated, black, plastic appearance; adheres to solid surfaces.

As noted previously, an acceptable floc does not cause operational problems in the system by adherence, plugging, and interface build-up. An unacceptable floc formation causes operational problems in the system by means of adherence, plugging and interface problems. This testing procedure is referred to as the Floc Manageability Determination Method.

In the working examples, set forth below, the various water clarifying compositions were evaluated by a bench scale flotation testing procedure.

Dithiocarbamate Synthesis Procedure

Numerous procedures well known to those skilled in the art may be utilized to make a dithiocarbamate useful in the present invention. The following procedure was used for the synthesis of the dithiocarbamates of the present invention.

A 500 ml flask equipped with a magnetic stirrer, thermometer, dropping funnel and reflux condenser may be utilized into which is placed the indicated weight percentages of the desired alkali metal hydroxide (normally NaOH or KOH), water, the indicated amine and carbon disulfide ($CS_2$). The mixture without $CS_2$ is cooled externally in an ice bath to approximately 10° to 15° C., and then the $CS_2$ is added over a period of about 30 minutes with vigorous agitation while maintaining the reaction temperature below 15° C. After an additional 10 minutes at about 15° C., the ice bath may be removed and the reaction mixture allowed to warm up to room temperature with stirring continued for about 1 hour. Before transferring the final product, the reactor is purged with nitrogen/air to remove any residual $CS_2$ or hydrogen sulfide which may have been produced during the preparation. The resulting product will be the alkali metal salt of the dithiocarbamic acid of the amine, or alternately termed alkali metal dithiocarbamate.

A 35% active solution of DTC A in water can be prepared by the above procedure using the following stoichiometry:

| Dithiocarbamate A | | |
| --- | --- | --- |
| Compound | Wt. % | Mole ratio |
| BHMT | 17.06 | 1 |
| $CS_2$ | 18.10 | 3 |
| KOH | 13.34 | 3 |
| Water | 51.50 | — |

A large number of simple bottle tests were conducted as a quick screening tool to find the most prominent candidates. The bottle test is a method in which samples of a selected fluid are treated with varying levels of chemicals to be evaluated and agitated in a manner simulating conditions in a given aqueous system. After settling for a designated period, the performance of the chemicals is observed. However, these tests are quite qualitative and are not treated as finally determinative of good compositions. For example, a composition that performs well in the bottle test may perform poorly in the more representative bench scale flotation test. Conversely, a candidate composition that performs poorly in the bottle test could be an excellent performer in the bench scale flotation test, which will be described in more detail below. Given the nature of these tests, the limited usefulness of the results and their large number, the bottle test data are not reported herein.

Bench Scale Flotation Tests

Water clarification performance may be determined in the test set forth below by means of a flotation test procedure. this procedure simulates the performance of the compositions evaluated in treatment systems utilizing flotation devices for the clarification.

Dispersed gas and air flotation procedures have become accepted and increasingly popular processes for the treatment of effluent waters in the oil field. Among the types of equipment being used in this process include processes using the WEMCO ® depurator of the Enviortech Division of Baker Hughes Incorporated. Induced air flotation equipment facilitate removal of suspended solids and oil from water by generating and dispersing throughout the water finely divided gas or air bubbles. These bubbles interact with contaminant particles, increasing their buoyancy and causing them to be floated to the surface where they are removed.

Chemical aids are frequently required in conjunction with the use of induced air flotation equipment. Such aids act to destabilize the oil or solids in the water, to coagulate or agglomerate the destabilized particles, to provide for interaction of the destabilized contaminants with dispersed bubbles to accomplish the lift of the contaminants, and to form a froth to keep the floated material in a stable position until it is removed by skimming. A bench test procedure simulating this process has been utilized in the working examples to test the prepared samples for water clarification and floc characteristics. Representative samples of the water to be clarified are obtained and treated by means of use of a bench scale flotation cell. Individual tests are conducted in the absence of any treatment chemical and repeated sequentially utilizing different chemicals and dosage levels until a satisfactory response is obtained. The tests are conducted utilizing operating parameters which simulate conditions in a given aqueous system. The operation of bench scale flotation cells are well known to those skilled in the art. During and at the conclusion of the tests, several observations are made and recorded. The water clarity at the end of the test is determined by standard procedures using extraction with a suitable solvent with gravimetric or spectrophotometric gravitation.

The bench scale flotation tests and the results are reported in Table I. The compositions that had the best performance are denoted with an asterisk (*) in the comments column. A sufficient number of compositions give good results to indicate a significant discovery of floc modifiers for use with water clarifiers. Prior to this time, it was believed that one compound could perform both floc and water clarification functions. However, this data indicates that a two component system gives excellent results as compared with prior materials such as DTC A or DTC D.

In Tables I through IV, the oil and grease concentration in the treated water was determined using the aforementioned U.S. Environmental Protection Agency 625-/6-74-003, 1974 procedure using a Wilks infrared spectrophotometer. The higher the % T (transmittance), the lower the oil and grease content.

TABLE I

Bench Scale Flotation Tests

| Ex. | Floc Modifier | wt. % | Water Clarifier | wt. % ppm | Floc rating | % T | ppm. oil | Comments |
|---|---|---|---|---|---|---|---|---|
| 1 | Blank | — | — | — 0 | | 22 | 126 | |
| 2 | — | — | DTC A | 35 45 | Unacc. | 90 | 9 | |
| 3 | | — | W213 | 35 45 | Acc. | 86 | 13 | |
| 4 | — | — | DTC D | 35 45 | Unacc. | 94 | 5 | |
| 5 | DETA | 15 | DTC A | 35 45 | Acc. | 91 | 8 | * |
| 6 | DETA | 30 | DTC A | 35 45 | Acc. | 81 | 18 | * |
| 7 | DETA | 44 | DTC A | 35 45 | Acc. | 77 | 22 | * |
| 8 | Arnox ® 904 | 15 | DTC A | 35 45 | Unacc. | 84 | 15 | |
| 9 | Arnox 904 | 30 | DTC A | 35 45 | Unacc. | 70 | 29 | Worse than DTC A |
| 10 | Arnox 904 | 44 | DTC A | 35 45 | Unacc. | 65 | 36 | Worse than DTC A |
| 11 | Arnox ® 906 | 15 | DTC A | 35 45 | Unacc. | 71 | 28 | |
| 12 | Arnox 906 | 30 | DTC A | 35 45 | Unacc. | 52 | 54 | |
| 13 | Arnox 906 | 44 | DTC A | 35 45 | Unacc. | 41 | 74 | |
| 14 | 1,4-DACH | 15 | DTC A | 35 45 | Acc. | 91 | 8 | * |
| 15 | 1,4-DACH | 30 | DTC A | 35 45 | Acc. | 91 | 8 | * |
| 16 | 1,4-DACH | 44 | DTC A | 35 45 | Acc. | 87 | 12 | * |
| 17 | AEEA | 15 | DTC A | 35 45 | Acc. | 88 | 11 | * |
| 18 | AEEA | 30 | DTC A | 35 45 | Acc. | 92 | 7 | * |
| 19 | AEEA | 44 | DTC A | 35 45 | Acc. | 89 | 10 | * |
| 20 | 1,2-propanediamine | 30 | DTC A | 35 45 | Acc. | 92 | 7 | * |
| 21 | 1,2-propanediamine | 45 | DTC A | 35 45 | Acc. | 90 | 9 | * |
| 22 | Ethylene diamine | 15 | DTC A | 35 45 | Acc. | 94 | 5 | * |
| 23 | Ethylene diamine | 30 | DTC A | 35 45 | Acc. | 92 | 7 | * |
| 24 | Ethylene diamine | 45 | DTC A | 35 45 | Acc. | 93 | 6 | * |
| 25 | TREN | 15 | DTC A | 35 45 | Acc. | 90 | 9 | * |
| 26 | TREN | 30 | DTC A | 35 45 | Acc. | 92 | 7 | * |
| 27 | TREN | 45 | DTC A | 35 45 | Acc. | 90 | 9 | * |
| 28 | 4,4'-diamino-dicyclohexyl methane | 30 | DTC A | 35 45 | Acc. | 45 | 66 | |
| 29 | 4,4'-diamino-dicyclohexyl methane | 45 | DTC A | 35 45 | Acc. | 55 | 49 | |
| 30 | 1,3-propanediamine | 45 | DTC A | 35 45 | Acc. | 87 | 12 | * |
| 31 | PEI (mw = 300) | 15 | DTC A | 35 45 | Acc. | 84 | 15 | |
| 32 | PEI (mw = 300) | 30 | DTC A | 35 45 | Acc. | 86 | 13 | * |

TABLE II

Bench Scale Flotation Tests

| Ex. | Floc Modifier | wt. % | Water Clarifier | wt. % ppm | Floc rating | % T | ppm. oil | Comments |
|---|---|---|---|---|---|---|---|---|
| 33 | Blank | — | — | — 0 | | 46 | 64 | |
| 34 | | — | W213 | 35 45 | Acc. | 92 | 7 | |
| 35 | — | — | DTC A | 35 45 | Unacc. | 93 | 6 | |
| 36 | DETA | 45 | DTC A | 35 45 | Acc. | 86 | 13 | |
| 37 | $N_3$ amine | 15 | DTC A | 35 45 | Acc. | 91 | 8 | * |
| 38 | $N_3$ amine | 30 | DTC A | 35 45 | Acc. | 87 | 12 | |
| 39 | $N_3$ amine | 45 | DTC A | 35 45 | Acc. | 84 | 15 | |
| 40 | PEH | 15 | DTC A | 35 45 | Acc. | 91 | 8 | * |
| 42 | PEH | 30 | DTC A | 35 45 | Acc. | 86 | 13 | |
| 43 | PEH | 45 | DTC A | 35 45 | Acc. | 87 | 12 | |
| 44 | $N_4$ amine | 15 | DTC A | 35 45 | Acc. | 90 | 9 | * |
| 45 | $N_4$ amine | 30 | DTC A | 35 45 | Acc. | 88 | 11 | |
| 46 | $N_4$ amine | 45 | DTC A | 35 45 | Acc. | 82 | 17 | |
| 47 | Octanol | 15 | DTC A | 35 45 | Unacc. | 90 | 9 | |
| 48 | Octanol | 30 | DTC A | 35 45 | Unacc. | 91 | 8 | |
| 49 | Octanol | 45 | DTC A | 35 45 | Unacc. | 79 | 20 | |
| 50 | 18-CROWN-16 | 15 | DTC A | 35 45 | Acc. | 94 | 5 | |
| 51 | 18-CROWN-16 | 30 | DTC A | 35 45 | Acc. | 94 | 5 | |
| 52 | — | — | DTC A | 35 45 | Unacc. | 93 | 6 | |

TABLE III

Bench Scale Flotation Tests

| Ex. | Floc Modifier | wt. % | Water Clarifier | wt. % ppm | Floc rating | % T | ppm. oil | Comments |
|---|---|---|---|---|---|---|---|---|
| 53 | Blank | — | — | — 0 | | 64 | 37 | |
| 54 | — | — | DTC A | 35 45 | Unacc. | 96 | 3 | |
| 55 | | — | W213 | 35 45 | Acc. | 94 | 5 | |
| 56 | Ethanolamine | 45 | DTC A | 35 45 | Unacc. | 88 | 11 | |
| 57 | 6-Hydroxylhexyl amine | 15 | DTC A | 35 45 | Unacc. | 89 | 10 | |
| 58 | 6-Hydroxylhexyl amine | 30 | DTC A | 35 45 | Unacc. | 91 | 8 | |
| 59 | Surfonamine MNPA-750 | 30 | DTC A | 35 45 | Unacc. | 54 | 51 | |
| 60 | Surfonamine MNPA-750 | 45 | DTC A | 35 45 | Unacc. | 51 | 56 | |
| 61 | Neodol 25-7 | 15 | DTC A | 35 45 | Unacc. | 43 | 71 | |
| 62 | Neodol 25-7 | 30 | DTC A | 35 45 | Unacc. | 42 | 72 | |
| 63 | Neodol 91-2.5 | 15 | DTC A | 35 45 | Unacc. | 64 | 37 | |
| 64 | Neodol 91-2.5 | 30 | DTC A | 35 45 | Unacc. | 31 | 97 | |
| 65 | Neodol 91-2.5 | 45 | DTC A | 35 45 | Unacc. | 39 | 78 | |

TABLE III-continued

Bench Scale Flotation Tests

| Ex. | Floc Modifier | wt. % | Water Clarifier | wt. % | ppm. | Floc rating | % T | ppm. oil | Comments |
| --- | --- | --- | --- | --- | --- | --- | --- | --- | --- |
| 66 | Neodol 91-6 | 15 | DTC A | 35 | 45 | Unacc. | 47 | 63 | |
| 67 | Neodol 91-6 | 30 | DTC A | 35 | 45 | Unacc. | 35 | 87 | |
| 68 | Neodol 91-6 | 45 | DTC A | 35 | 45 | Unacc. | 37 | 83 | |
| 69 | Neodol 91-8 | 30 | DTC A | 35 | 45 | Unacc. | 42 | 72 | |
| 70 | Neodol 91-8 | 45 | DTC A | 35 | 45 | Unacc. | 35 | 87 | |
| 71 | Pluronic F-38 | 15 | DTC A | 35 | 45 | Acc. | 74 | 25 | * |
| 72 | Pluronic F-38 | 30 | DTC A | 35 | 45 | Acc. | 88 | 11 | * |
| 73 | Pluronic L-43 | 15 | DTC A | 35 | 45 | Unacc. | 60 | 42 | |
| 74 | Pluronic L-43 | 30 | DTC A | 35 | 45 | Unacc. | 65 | 36 | |
| 75 | Pluronic L-43 | 45 | DTC A | 35 | 45 | Unacc. | 53 | 52 | |
| 76 | Pluronic P-85 | 15 | DTC A | 35 | 45 | Acc. | 57 | 46 | |
| 77 | Pluronic F-88 | 15 | DTC A | 35 | 45 | Acc. | 81 | 17 | |

TABLE IV

Bench Scale Flotaton Tests

| Ex. | Floc Modifier | wt. % | Water Clarifier | wt. % | ppm. | Floc rating | % T | ppm. oil | Comments |
| --- | --- | --- | --- | --- | --- | --- | --- | --- | --- |
| 78 | — | — | DTC B | 35 | 45 | Acc. | 82 | 17 | |
| 79 | — | — | DTC C | 35 | 45 | Acc. | 82 | 17 | |
| 80 | BHMT Bottoms | 15 | DTC B | 35 | 45 | Acc. | 87 | 12 | * |
| 81 | — | — | DTC D | 35 | 45 | Unacc. | 93 | 6 | |
| 82 | BHMT Bottoms | 15 | DTC D | 35 | 45 | Acc. | 91 | 8 | |

That the floc modifiers of this invention do, in fact, improve the floc rating to "Acceptable" from "Unacceptable" during these tests can be seen by comparing the results in Example 2 which uses no floc modifier, with the results of Examples 5-7, and Examples 14-32 which employ various floc modifiers. Contrast also Example 35 which used no floc modifier with Examples 34 and 36 through 46 and 50-51 which use various floc modifiers. Compare also the results of Example 54 which uses no floc modifier with the results of Examples 55, 71-72 and 76-77 which do use floc modifiers. In each of the Examples noted above, DTC A was employed as the water clarifier.

With reference to Example 78 using DTC B as the water clarifier, note that when BHMT bottoms were employed as a floc modifier thereto in Example 80 that the floc rating remained acceptable and the transmittance increased and the oil and grease content decreased. Compare also Examples 81 and 82 where both used DTC D as the water clarifier. No floc modifier was employed in Example 81 and the floc was unacceptable. However, BHMT bottoms were employed as a floc modifier in Example 82 and the floc was acceptable.

The composition which includes the floc modifiers of the invention and which is used in the method of the invention may contain other additives, such as hydrogen sulfide ($H_2S$) scavengers, scale and corrosion inhibitors, anti-oxidants, demulsifiers or the like. These other materials may be added in relative quantities to control the secondary properties so desired.

Many modifications may be made in the present invention without departing from spirit and scope thereof which are defined only by the appended claims. For example, compositions of water clarifiers and floc modifiers other than those specifically set out herein may be found by one of routine skill in the art to be particularly advantageous. Indeed, it is contemplated that more than one water clarifier or more than one floc modifier may be employed which was inadvertently omitted.

GLOSSARY

| | |
| --- | --- |
| AEEA | Aminoethylethanolamine. |
| Amine HH | Union Carbide trade name describing an impure (bottoms) source of aminoethylpiperazine. |
| Arnox ® 904 | Baker Performance Chemicals, Inc. trade name for ethoxylated nonylphenol, formula weight = 380. |
| Arnox ® 906 | Baker Performance Chemicals, Inc. trade name for ethoxylated nonylphenol, formula weight = 470. |
| BHMT | Bis(hexamethylene)triamine. |
| 1,4-DACH | 1,4-diaminocyclohexane. |
| DETA | Diethylenetriamine |
| DTC | Dithiocarbamate. |
| DTC A | Dithiocarbamate formed in the reaction of BHMT with 3 equivalents of $CS_2$. |
| DTC B | Dithiocarbamate formed in the reaction of Amine HH with 2 equivalents of $CS_2$. |
| DTC C | Dithiocarbamate formed in the reaction of AEEA with 3 equivalents of $CS_2$. |
| DTC D | Dithiocarbamate formed in the reaction of Texaco Chemical's Jeffamine ® T-403 amine with 3 equivalents of $CS_2$. |
| EDA | Ethylenediamine. |
| Jeffamine ® D-400 | Texaco Chemical Co. trade name for a polyoxypropylene diamine having a molecular weight of about 400 [CAS No. 9046-10-0]. |
| Jeffamine D-2000 | Texaco Chemical Co. trade name for a polyoxypropylene diamine having a molecular weight of about 2000 [CAS No. 9046-10-0]. |
| Jeffamine ED-600 | Texaco Chemical Co. trade name for a 600 molecular weight aliphatic primary diamine derived from propylene oxide-capped polyethylene glycol. |
| Jeffamine M-600 | Texaco Chemical Co. trade name for a 600 molecular weight aliphatic primary amine derived from an ethylene oxide/propylene oxide polymer [CAS No. 70914-41-9]. |
| Jeffamine M-1000 | Texaco Chemical Co. trade name for a 1000 molecular weight aliphatic primary amine derived from an ethylene oxide/propylene oxide polymer [CAS No. 70914-41-9]. |
| Jeffamine T-403 | Texaco Chemical Co. trade name for a 440 molecular weight aliphatic primary triamine derived from propoxylated trimethylolpropane [CAS No. 39423-51-3]. |
| Jeffamine T-3000 | Texaco Chemical Co. trade name for a 3000 molecular weight aliphatic primary triamine |

-continued
GLOSSARY

| | |
|---|---|
| | derived from propoxylated glycerine. |
| Jeffamine T-5000 | Texaco Chemical Co. trade name for a 5000 molecular weight glycerin-based polyoxypropylene triamine [CAS No. 64852-22-8]. |
| MAGNA-CLEAR ® W213 | Baker Performance Chemicals, Inc. trade name for the water clarifier of U.S. Pat. No. 4,855,060. |
| $N_3$ Amine | BASF trade name for N-(2-aminoethyl)-1,3-propanediamine. |
| $N_4$ Amine | BASF trade name for N,N'-bis-(3-aminopropyl)ethylenediamine. |
| Neodol ® 25-3 | Shell Chemical Co. trade name for a 336 molecular weight ethoxylated linear alcohol in the $C_{12}$ to $C_{15}$ range. |
| Neodol 25-7 | Shell Chemical Co. trade name for a 522 molecular weight ethoxylated linear alcohol in the $C_{12}$ to $C_{15}$ range. |
| Neodol 25-9 | Shell Chemical Co. trade name for a 610 molecular weight ethoxylated linear alcohol in the $C_{12}$ to $C_{15}$ range. |
| Neodol 25-12 | Shell Chemical Co. trade name for a 729 molecular weight ethoxylated linear alcohol in the $C_{12}$ to $C_{15}$ range. |
| Neodol 91-2.5 | Shell Chemical Co. trade name for a 282 molecular weight ethoxylated linear alcohol in the $C_9$ to $C_{11}$ range. |
| Neodol 91-6 | Shell Chemical Co. trade name for a 425 molecular weight ethoxylated linear alcohol in the $C_9$ to $C_{11}$ range. |
| Neodol 91-8 | Shell Chemical Co. trade name for a 529 molecular weight ethoxylated linear alcohol in the $C_9$ to $C_{11}$ range. |
| PEH | Pentaethylenehexamine. |
| PEI | Polyethyleneimine. |
| Pluronic ® F-38 | BASF trade name for a block copolymer of ethylene oxide with propylene oxide, formula weight = 4750. |
| Pluronic F-88 | BASF trade name for a block copolymer of ethylene oxide with propylene oxide, formula weight = 11,250. |
| Pluronic L-31 | BASF trade name for a block copolymer of ethylene oxide with propylene oxide, formula weight = 1055. |
| Pluronic L-43 | BASF trade name for a block copolymer of ethylene oxide with propylene oxide, formula weight = 1714. |
| Pluronic L-61 | BASF trade name for a block copolymer of ethylene oxide with propylene oxide, formula weight = 1944. |
| Pluronic L-72 | BASF trade name for a block copolymer of ethylene oxide with propylene oxide, formula weight = 2562. |
| Pluronic L-81 | BASF trade name for a block copolymer of ethylene oxide with propylene oxide, formula weight = 2500. |
| Pluronic P-85 | BASF trade name for a block copolymer of ethylene oxide with propylene oxide, formula weight = 4500. |
| Surfonamine ® MNPA-380 | Texaco Chemical Co. trade name for a primary amine derived from a nonylphenol ethoxylate, formula weight = 380. |
| Surfonamine MNPA-750 | Texaco Chemical Co. trade name for a primary amine derived from a nonylphenol ethoxylate. |
| TETA | Triethylenetetramine. |
| TREN | W. R. Grace trade name for tris-(2-aminoethyl)amine. |

We claim:

1. A method of clarifying an aqueous system without production of a problematic floc in the system, comprising the steps of:
   contacting the system with an effective water clarifying amount of a composition having present therein a dithiocarbamate;
   including in the composition an effective amount of a floc modifier selected from the group consisting of amines, alcohols, aminoalcohols, ethers, and mixtures thereof, and halogenated adducts thereof; and maintaining the composition in the system for sufficient time to effectively clarify the system without production of a problematic floc.

2. The method of claim 1 where after the system is effectively clarified, the floc is removed therefrom.

3. The method of claim 1 where the proportion of water clarifier component is greater than about 5 wt. % and less than about 90 wt. %, and where the proportion of floc modifier component is less than about 60 wt. % and greater than about 1 wt. %, based on the water clarifier composition.

4. The method of claim 1 where the proportion of water clarifier component ranges from about 20 wt. % to about 70 wt. %, and where the proportion of floc modifier component ranges from about 10 wt. % to about 50 wt. %, based on the water clarifier composition.

5. The method of claim 1 where the floc modifier component is selected from the group consisting of amines, alcohols, aminoalcohols, ethers and mixtures thereof, having at least one —$(CH_2)_j$— group where j ranges from 1 to 8, and halogenated adducts thereof.

6. The method of claim 1 where the floc modifier component is selected from the group of compounds having the formulae:

$$X[(CH_2)_aY]_b(CH_2)_cZ$$

where X and Z are independently —$NH_2$, —OH or —H; Y is —O—, —NH—, —$N[(CH_2)_nZ]$—, —$NHCH_2CH_2NH$—, —$CH[(CH_2)_nZ]$— or —$C[(CH_2)_nZ][(CH_2)_mX]$—, a ranges from 2 to 6, b ranges from 0 to 1400, and c, n and m independently range from 0 to 12; except that b and c cannot both be zero;

$$R(OCH_2CH_2)_d(OCH_2CH)_i(OCH_2CH_2)_j(OCH_2CHZ)_p(-OH)_{1-p}$$
with $CH_3$ groups on the indicated carbons where Z is defined above, R is —H or an alkyl, aryl or alkylaryl hydrocarbon chain containing less than 19 carbon atoms, d and j independently range from 0 to 102, i ranges from 0 to 39 and p is 0 or 1;

$$N[(CH_2)_aZ]_3$$

where Z and a are defined as above;

$$Z_{1-p}(CH_2)_p[(C_6H_{10})X]_{p+1}$$

where x, Z and p are defined as above; and

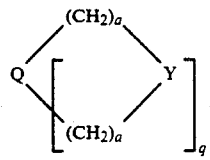

where Q is —O—, —NH— or —$N[(CH_2)_nZ]$—, q ranges from 1 to 17, and Y, Z, a and n are defined as above.

7. The method of claim 1 where the water clarifier component is a salt of a dithiocarbamate selected from the group consisting of alkali metal, alkali earth metal, ammonium and amine salts thereof, and mixtures thereof.

8. A method of clarifying an aqueous system without production of a problematic floc in the system, comprising the steps of:
    contacting the system with an effective water clarifying amount of a composition having present therein a dithiocarbamate water clarifier in a proportion of greater than about 5 wt. % and less than about 90 wt. % of the composition;
    including in the composition a floc modifier selected from the group consisting of amines, alcohols, aminoalcohols, ethers, and mixtures thereof having at least one —(CH$_2$)$_j$— group where j ranges from 1 to 8, and halogenated adducts thereof, the floc modifier in a proportion of greater than about 1 wt. % and less than about 60 wt. % of the composition;
    maintaining the composition in the system for sufficient time to effectively clarify the system without production of a problematic floc; and
    removing the floc from the system.

9. The method of claim 8 where the proportion of water clarifier component ranges from about 20 wt. % to about 70 wt. %, and where the proportion of floc modifier component ranges from about 10 wt. % to about 50 wt. %, based on the water clarifier composition.

10. The method of claim 8 where the floc modifier component is selected from the group of compounds having the formulae:

$$X[(CH_2)_aY]_b(CH_2)_cZ$$

where X and Z are independently —NH$_2$, —OH or —H; Y is —O—, —NH—, —N[(CH$_2$)$_n$Z]—, —NHCH$_2$CH$_2$NH—, —CH[(CH$_2$)$_n$Z]— or —C[(CH$_2$)$_n$Z][(CH$_2$)$_m$X]—, a ranges from 2 to 6, b ranges from 0 to 1400, and c, n and m independently range from 0 to 12; except that b and c cannot both be zero;

where Z is defined above, R is —H or an alkyl, aryl or alkylaryl hydrocarbon chain containing less than 19 carbon atoms, d and j independently range from 0 to 102, i ranges from 0 to 39 and p is 0 or 1;

$$N[(CH_2)_aZ]_3$$

where Z and a are defined as above;

$$Z_{1-p}(CH_2)_p[(C_6H_{10})X]_{p+1}$$

where x, Z and p are defined as above; and

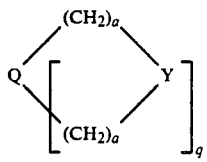

where Q is —O—, —NH— or —N[(CH$_2$)$_n$Z]—, q ranges from 1 to 17, and Y, Z, a and n are defined as above.

11. The method of claim 8 where the water clarifier component is a salt of a dithiocarbamate selected from the group consisting of alkali metal, alkali earth metal, ammonium and amine salts thereof, and mixtures thereof.

* * * * *

UNITED STATES PATENT AND TRADEMARK OFFICE
CERTIFICATE OF CORRECTION

PATENT NO. : 5,302,296
DATED : April 12, 1994
INVENTOR(S) : Evain et al.

It is certified that error appears in the above-identified patent and that said Letters Patent is hereby corrected as shown below:

At column 11, line 68, please delete "employed which was inadvertently omitted." and insert —employed.— therefor.

Signed and Sealed this

Twenty-seventh Day of September, 1994

Attest:

BRUCE LEHMAN

*Attesting Officer*      *Commissioner of Patents and Trademarks*